(12) United States Patent
Singh et al.

(10) Patent No.: US 9,037,109 B1
(45) Date of Patent: May 19, 2015

(54) CONTROLLING BILLING FOR USE OF ONE SYSTEM BASED ON DEVICE LOCATION IN OTHER SYSTEM

(75) Inventors: Jasinder P. Singh, Olathe, KS (US);
Maulik K. Shah, Overland Park, KS (US); Siddharth S. Oroskar, Overland Park, KS (US); Sachin R. Vargantwar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 689 days.

(21) Appl. No.: 13/411,207

(22) Filed: Mar. 2, 2012

(51) Int. Cl.
*H04M 11/00* (2006.01)
*H04W 4/24* (2009.01)

(52) U.S. Cl.
CPC ........................................ *H04W 4/24* (2013.01)

(58) Field of Classification Search
USPC ......... 455/403, 406–408, 432.1, 456.1–456.6
See application file for complete search history.

(56) References Cited

U.S. PATENT DOCUMENTS

| | | | |
|---|---|---|---|
| 3,710,335 A | 1/1973 | Lepley | |
| 5,528,247 A | 6/1996 | Nonami | |
| 5,736,962 A | 4/1998 | Tendler | |
| 6,233,448 B1 | 5/2001 | Alperovich et al. | |
| 6,608,592 B2 | 8/2003 | McReynolds | |
| 6,625,451 B1 * | 9/2003 | La Medica et al. | 455/434 |
| 6,963,749 B2 | 11/2005 | Hayashida | |
| 6,993,345 B2 | 1/2006 | Ogino et al. | |
| 7,117,015 B2 | 10/2006 | Scheinert et al. | |
| 7,181,207 B1 | 2/2007 | Chow et al. | |
| 7,221,928 B2 | 5/2007 | Laird et al. | |
| 7,227,710 B2 | 6/2007 | Blaum et al. | |
| 7,272,121 B2 | 9/2007 | Wilkes et al. | |
| 7,283,091 B1 | 10/2007 | Loomis | |
| 7,577,443 B1 | 8/2009 | Moll et al. | |
| 7,595,752 B2 | 9/2009 | van Diggelen et al. | |
| 7,668,765 B2 | 2/2010 | Tanaka et al. | |
| 7,831,216 B1 | 11/2010 | Yenney et al. | |
| 2004/0132466 A1* | 7/2004 | Kennedy, Jr. | 455/456.1 |
| 2004/0204097 A1 | 10/2004 | Scheinert et al. | |
| 2006/0072537 A1 | 4/2006 | Lee et al. | |
| 2006/0291427 A1 | 12/2006 | Park | |
| 2007/0135140 A1 | 6/2007 | Tervo | |
| 2008/0076412 A1* | 3/2008 | Khetawat et al. | 455/432.1 |
| 2008/0119160 A1 | 5/2008 | Andriantsiferana et al. | |
| 2008/0244148 A1 | 10/2008 | Nix, Jr. et al. | |
| 2008/0299992 A1 | 12/2008 | Eitan et al. | |
| 2009/0011779 A1 | 1/2009 | MacNaughtan et al. | |

OTHER PUBLICATIONS

M. Amundson, "Dead Reckoning for consumer Electronics," 2006 Honeywell International.
Office action from U.S. Appl. No. 11/945,964, dated Dec. 24, 2009.

(Continued)

*Primary Examiner* — Ajit Patel

(57) ABSTRACT

A method and corresponding system for controlling billing for communication service. An area of coverage of a first wireless serving system is dynamically determined based on signals from one or more mobile stations served by the first wireless serving system. A determination is then made as to whether a mobile station was within the determined area of coverage of the first wireless serving system when the mobile station was being served with communication service by a second wireless serving system. And a billing rate, for billing for the communication service, is selected based at least in part on the determination.

20 Claims, 4 Drawing Sheets

(56) References Cited

OTHER PUBLICATIONS

Notice of allowance from U.S. Appl. No. 11/945,964, dated Jul. 7, 2010.
Office action from U.S. Appl. No. 11/960,987, dated Dec. 11, 2008.
Notice of allowance from U.S. Appl. No. 11/960,987, dated May 14, 2009.
U.S. Appl. No. 11/954,072, filed Dec. 11, 2007.
Office action from U.S. Appl. No. 11/954,072, dated Oct. 14, 2009.
Office action from U.S. Appl. No. 11/954,072, dated Apr. 2, 2010.
Office action from U.S. Appl. No. 11/954,072, dated Jun. 15, 2010.
Office action from U.S. Appl. No. 11/954,072, dated Feb. 25, 2011.
Office action from U.S. Appl. No. 11/954,072, dated Aug. 8, 2011.

* cited by examiner

CONTROLLING BILLING FOR USE OF ONE SYSTEM BASED ON DEVICE LOCATION IN OTHER SYSTEM

BACKGROUND

Unless otherwise indicated herein, the materials described in this section are not prior art to the claims and are not admitted to be prior art by inclusion in this section.

In typical cellular wireless communications, each end-user device (e.g., cell phone, personal digital assistant, wirelessly equipped personal computer, etc.) subscribes to service from a given cellular wireless carrier known as the device's home carrier. In practice, the home carrier will operate a radio access network including base stations that radiate to define wireless coverage areas in which the end-user devices can operate throughout a region and that provide connectivity with core network infrastructure. This regional radio access network may be considered a "macro network," and the base stations may be considered "macro network base stations." When a device enters into coverage of its home carrier's macro network, the device may then register with the macro network and may then engage in wireless communication service via the macro network, and the home carrier may accordingly charge or debit a service account of the device for that communication service.

Although a typical cellular carrier may strive to offer wireless coverage throughout a region, such as nationally in the United States for instance, the carrier may not actually operate radio access networks in all locations throughout the region. Further, even in areas where the carrier operates a macro network, the coverage of that network may not extend to all locations, due to base station design or implementation, air interface obstructions, and other factors.

One way for a carrier to help fill in the gaps in its coverage is for the carrier to enter into roaming agreements with other carriers. Under a roaming agreement, another carrier may agree to provide service to the home carrier's subscriber devices when the devices are served by base stations of the roaming carrier's network. Thus, when a device that subscribes to the home carrier cannot find coverage of the home carrier's network and enters into coverage of a roaming carrier's network, the device may register for service with the roaming carrier's network and may then engage in wireless communication service via the roaming carrier's network. In accordance with a roaming agreement, the roaming carrier may then report that usage to the home carrier and may charge the home carrier for the usage. In turn, the home carrier may then pass an associated charge along to the service account of the device.

Another way for a carrier to help fill in the gaps in its coverage is for the carrier to provide its subscribers with personal base stations, commonly known as "femtocells". A femtocell is typically a small device, about the size of a WIFI access point, that is arranged to communicate through a broadband Internet connection with a carrier's core network infrastructure, and to operate on a small scale in much the same way that a conventional base station does. In practice, a subscriber may obtain a femtocell from its carrier, connect the femtocell to a home or office Internet router, and enjoy improved or enhanced service within the coverage of the femtocell. When a device that subscribes to a home carrier is within coverage of such a femtocell, the device may register with the femtocell and may then engage in wireless communication service via the femtocell, and the home carrier may accordingly charge or debit a service account of the device for that communication service.

Overview

In some cases, a carrier may charge its subscribers at different billing rates for communication service depending on which wireless system serves its subscribers, such as whether the subscribers are served by the carrier's macro network, by a roaming partner's network, or by a femtocell. Further, in some cases, the billing rate may be effectively zero, meaning that the carrier may allow such service to occur without charge.

By way of example a carrier might charge its subscribers at a particular billing rate for communication service provided to its subscriber by the carrier's macro network. However, the carrier might charge its subscribers at a higher billing rate for communication service provided to its subscribers by a roaming partner's network, perhaps to account for roaming fees and the like. Further, the carrier might charge its subscribers at a lower billing rate for communication service provided to its subscribers by a femtocell, perhaps to account for the fact that femtocells help to offload air interface traffic from the carrier's macro network.

These billing rates can take various forms but generally relate to the extent to which the carrier charges or debits a subscriber account for use of communication service. By way of example, a billing rate can be an amount of money or number of communication units that the carrier charges or debits against a subscriber's account for each unit (e.g., minute, kilobyte, etc.) of communication service provided to the subscriber. Thus, a billing rate could be a particular value charged per unit of communication service provided. Further, a billing rate could include a Boolean indication of whether or not to charge for particular communication service. For instance, the carrier may charge a subscriber's account a particular amount of money or number of communication units per unit of communication service provided by a particular serving system, and the carrier may charge the subscriber's account zero, i.e., not at all, for communication service provided by another serving system. Other examples are possible as well.

In practice, a subscriber might expect to be served by a particular system when in a particular area and might expect to be charged at a particular billing rate for communication service provided by that system. In certain situations, however, the subscriber may not be served by the expected system and may therefore incur a charge that is not in line with the subscriber's expectations. This may occur, for instance, if the expected coverage does not exist or if, for one reason or another, the subscriber's device does not acquire connectivity with the expected coverage.

For example, a subscriber may obtain a femtocell from the home carrier and arrange with the carrier to receive unlimited communication service when served by the femtocell but to be subject to a communication service limit (e.g., a maximum number of minutes or kilobytes per billing period) when served by the carrier's macro network. Thus, the subscriber may expect to be able to freely engage in communication service when within coverage of the femtocell without impacting the subscriber's macro network service limit. In practice, however, the subscriber's device might be within coverage of the femtocell but may, for one reason or another, be served by the macro network rather than the femtocell. As a result, the carrier may charge the subscriber's communication service against the subscriber's macro network limit, which may be contrary to the subscriber's expectation.

As another example, a subscriber may arrange with a home carrier to obtain communication service from the home carrier's network at a first billing rate (e.g., unlimited use) but to pay a higher, second billing rate for service when served by a roaming carrier. The subscriber may then have an expectation that when the subscriber is within coverage of the home carrier's network, the subscriber should receive communication service at the first billing rate. In practice, however, the subscriber's device might be within coverage of the home carrier's network but may, for one reason or another, be served by a roaming partner's network rather than by the home carrier's network. As a result, the home carrier may charge the subscriber at the second billing rate, which may be contrary to the subscriber's expectation.

Disclosed herein is a method and corresponding system to help control billing in a manner that may better align with subscriber expectations. In accordance with the method, for instance, the area of coverage of a first wireless serving system (e.g., a base station or group of base stations) is dynamically determined through interaction with mobile stations served by that wireless serving system. In turn, a determination is be made as to whether, when a given mobile station was served with communication service by a second wireless serving system, the given mobile station was located within the dynamically determined area of coverage of the first wireless serving system. The method may then involve using that determination as a basis to select a billing rate for billing an account of the given mobile station for the communication service by the second wireless serving system.

Applying this in the example femtocell scenario described above, for instance, the method may involve a femtocell receiving signals from one or more mobile stations served by the femtocell, using those received signals as a basis to determine locations of the one or more mobile stations, and using those determined locations as a basis to determine an area of coverage of the femtocell. The method may then involve making a determination of whether a given mobile station was located within that determined area of coverage of the femtocell when the given mobile station was served with communication service by the carrier's macro network (or perhaps by a roaming partner's network).

If the determination is that the given mobile station was located with the determined area of coverage of the femtocell when the given mobile station was served with communication service by the other system, then the home carrier may charge the subscriber's account at a billing rate of zero for that communication service (i.e., consider the service to be part of the subscriber's unlimited service), as the expectation would be that when the subscriber is within coverage of the femtocell the service would be unlimited.

On the other hand, if the determination is that the given mobile station was not located within the determined area of coverage of the femtocell when the given mobile station was served with communication service by the other system, then the home carrier may charge the subscriber's account at the billing rate agreed to be charged for communication service provided by the other network, as the expectation would be that when the subscriber is not within coverage of the femtocell, the subscriber would not benefit from unlimited service.

Likewise, applying this in the other example scenario described above, the method may involve a home carrier's macro network receiving signals from one or more mobile stations served by the macro network, using those received signals as a basis to determine locations of the one or more mobile stations, and using those determined locations as a basis to determine an area of coverage of the macro network. The method may then involve making a determination of whether a given mobile station was located within that determined area of coverage of the macro network when the given mobile station was served with communication service by a roaming partner's network.

If the determination is that the given mobile station was located with the determined area of coverage of the macro network when the given mobile station was served with communication service by the roaming partner's network, then the home carrier may charge the subscriber's account at the first billing rate for that communication service (i.e., consider the service to be part of the subscriber's home, macro network service), as the expectation would be that when the subscriber is within coverage of the home network, the service would be billed at the first billing rate.

On the other hand, if the determination is that the given mobile station was not located within the determined area of coverage of the macro network when the given mobile station was served with communication service by the roaming partner's network, then the home carrier may charge the subscriber's account at second billing rate, as the expectation would be that when the subscriber is not within coverage of the home network but is instead roaming, the subscriber would be charged at the second billing rate.

These as well as other aspects, advantages, and alternatives will become apparent to those of ordinary skill in the art by reading the following detailed description, with reference where appropriate to the accompanying drawings. Further, it should be understood that the disclosure provided in this overview section and elsewhere in this document is not intended to be limiting but is rather provided by way of example only.

DETAILED DESCRIPTION

Figure 1:
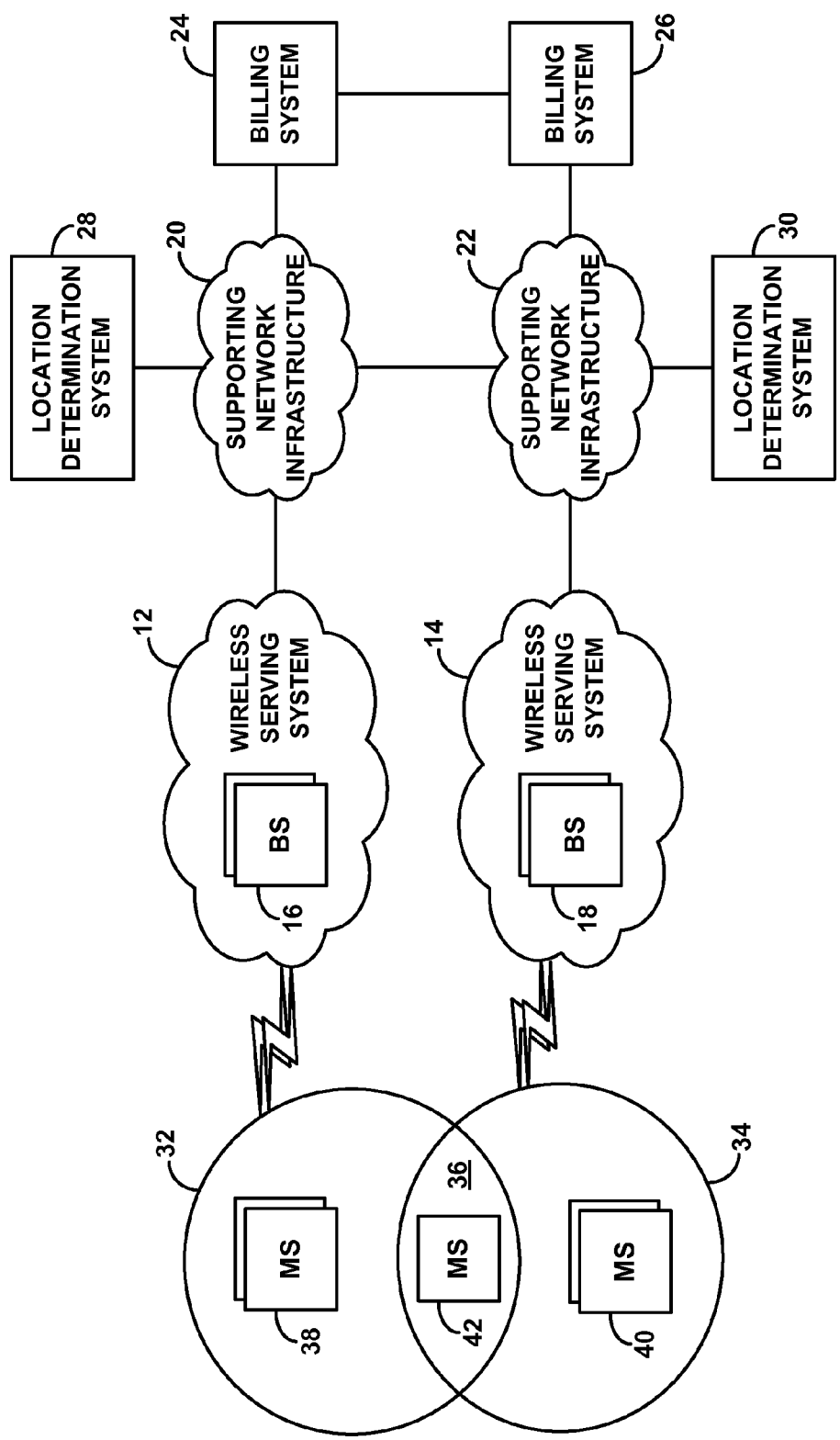
FIG. 1 is a simplified block diagram of a network arrangement in which the present method can be implemented

Referring to the drawings, as noted above, FIG. 1 is a simplified block diagram of an example network arrangement in which the present method can be implemented. It should be understood, however, that this and other arrangements described herein are provided as example only, and other arrangements and other elements (e.g., machines, interfaces, functions, orders of functions, etc.) can be used instead and some elements may be omitted altogether. Further, those skilled in the art will appreciate that many of the elements described herein are functional entities that may be implemented as discrete components or in conjunction with other components, in any suitable combination and location, and may be implemented at least in part by one or more computer processors executing program instructions stored in a non-transitory computer readable medium.

As shown in FIG. 1, the example network arrangement includes two example wireless serving systems 12, 14, each of which may be or include one or more base stations 16, 18 that are arranged to radiate so as to define one or more coverage areas in which mobile stations can operate. In practice, for instance, one of these wireless serving systems could be a femtocell that provides connectivity with a home carrier's core network and the other could be a macro network that provides connectivity with the home carrier's core network. Or one of these wireless serving systems could be a home carrier network and the other could be a roaming partner's network. Other examples are possible as well.

As further shown by way of example, each wireless serving system includes or is communicatively linked with supporting network infrastructure. In particular, serving system 12 is linked with supporting network infrastructure 20, and serving system 14 is linked with supporting network infrastructure 22. Although network infrastructure clouds 20, 22 are shown separately in the figure, they could be coupled together or combined together partly or entirely.

Supporting network infrastructure 20, 22 may include various switches, gateways, accounting servers, policy decision points, and other entities that may be involved with providing or facilitating communication service by the respective serving system. For example, if a serving system is a carrier's macro network, the supporting network infrastructure may include switches, gateways, servers, and the like that support communications by subscriber devices served by that macro network. And as another example, if a serving system is a femtocell, the supporting network infrastructure may include a femtocell controller or the like, arranged to securely communicate with the femtocell over an Internet connection and to provide connectivity with the supporting network infrastructure of the home carrier's macro network.

As further shown by way of example, each supporting network infrastructure includes or is communicatively linked with a billing system that facilitates charging subscriber accounts for communication service at particular billing rates (so as to facilitate generation and providing of bills and the like for that service). In particular, network infrastructure 20 is shown linked with billing system 24, and network infrastructure 22 is shown linked with billing system 26. Although these billing systems are shown separately in the figure, they could be coupled together or combined together partly or entirely.

Each billing system may be in signaling or bearer communication with one or more serving systems and/or supporting network infrastructure, to receive records of communication service provided to mobile stations by those serving systems, so that the billing system can appropriately charge for that communication service. As such, a billing system may receive usage records through network communication with one or more switches, gateways, accounting servers, policy decision points, and/or other entities that are involved with providing or facilitating the communication service at issue.

For instance, a carrier's billing system may receive communication usage records (such as call detail records (CDRs), IP detail records (IPDRs), etc.) from switches, gateways, and accounting servers involved with communication service provided by the carrier's macro network or one or more femtocells. Such usage records may include various information about the communication, such as a counts of units (e.g., minutes or kilobytes), a time and duration of the communication, an identity of the serving system serving the communication, and the like. Moreover, in some cases, multiple such usage records may be generated throughout the course of a communication.

Further, a carrier's billing system may receive such usage records and may pass the records or associated data via a network to another carrier's billing system to reconcile costs and charges with the other carrier.

As yet further shown by way of example, each supporting network infrastructure includes or is communicatively linked with a location determining system that may help facilitate determining location of one or more mobile stations served by one or more serving systems. In particular, network infrastructure 20 is shown coupled with location determination system 28, and network infrastructure 22 is shown coupled with location determination system 30. As with other elements shown in the figure, although these location determination systems are shown separately, they could be combined together partly or entirely. Further, to the extent separate location determination systems or portions thereof are provided, the systems could be arranged to communicate with each other, such as with one location determination system querying the other location determination system for a report of mobile station location and receiving in response a report of the requested location.

The location determination systems, like other entities shown, could take any of a variety of forms and could operate in various ways. By way of example, a representative location determination system may facilitate determining the location of a mobile station based on Global Positioning System (GPS) signaling. In practice, for instance, when the location of a mobile station is requested, the location determination system may signal to the mobile station through supporting network infrastructure and serving system, to obtain from the mobile station information regarding signals that the mobile station received from one or more base stations at known locations. Using that information, the location determination system may triangulate to roughly estimate the mobile station's location and may then provide the mobile station with satellite ephemeris data that enables the mobile station to tune to GPS satellites in the sky over the estimated location. The mobile station may then obtain signals from those satellites and provide the location determination system with information regarding those signals. And the location determination system may then use that information as a basis to determine the mobile station's location with fairly high granularity. The location determination system may then report the determined location to the requesting entity.

In practice, as noted above, the base station(s) 16, 18 of the serving system radiate to define one or more coverage areas in which mobile stations can operate. Thus, the coverage area of a given serving system may emanate from one or more base stations of that serving system. Further, the coverage area of a given serving system may be made up of multiple contiguous or non-contiguous portions.

In general, the coverage area, or area of coverage, of a given serving system is considered to be the physical area covered by that serving system, such as a particular geographic span of the serving system. For instance, if the base station(s) of a serving system radiate to provide coverage throughout a circular area surrounding a base station, that circular area is considered to be the coverage area of the serving system. Or if the base station(s) of a serving system radiate to provide coverage in some other radiation pattern, that radiation pattern is considered to be the coverage area of the serving system.

FIG. 1 illustrates serving system 12 having a first coverage area 32, and serving system 14 having a second coverage area 34. These coverage areas are shown as being circular areas of similar size. In reality, however, the coverage areas would likely not be circular and would be of different sizes. Further, the coverage areas are shown overlapping each other partially in area 36. In practice, however, the coverage areas could overlap each other to a greater extent and could, in one possible scenario, be entirely coterminous.

The base station(s) of the respective serving systems may radiate to define these coverage areas, and may operate, according to any of a variety of air interface protocols now known or later developed. Examples of such protocols include, without limitation, LTE, CDMA (e.g., IS-95, IS-2000, 1 xRTT, 1xEV-DO, etc.), WiMAX, TDMA, AMPS, GSM, GPRS, UMTS, and EDGE. Serving system 12 may operate according to the same air interface protocol as serving system 14, or the serving systems may operate according to different air interface protocols. For example, the base station(s) of both serving systems may operate according to LTE. And as another example, the base station(s) of one serving system may operate according to LTE and the base station(s) of the other serving system may operate according to CDMA. Other examples are possible as well.

Each serving system may be arranged to serve one or more mobile stations at a time. Shown operating in coverage area 32 of serving system 12, for instance, are one or more mobile stations 38, and shown operating in coverage area 34 of serving system 14 are then one or more mobile stations 40. These mobile stations may be operating all at once in the illustrated coverage areas or may operate in the illustrated coverage areas at different times. Further shown operating in overlap area 36 is a representative mobile station 42.

These mobile stations can take any of a variety of forms suitable for being served by one or more wireless serving systems and, particularly, being provided with wireless communication service by such system(s). By way of example, mobile stations can be cellular telephones, wirelessly equipped tablet computers, wirelessly equipped personal computers, wirelessly equipped gaming systems, wirelessly equipped embedded telemetry devices (e.g., machine-to-machine devices), or other wirelessly equipped devices now known or later developed. Notwithstanding their title, these devices need not be movable but are considered to be "mobile" because they can engage in cellular wireless communication at various locations. The mobile stations shown in FIG. 1 can all be the same types of devices or can be various different types of devices.

In practice, wireless serving systems may provide mobile stations with various types of wireless communication service, depending on the capabilities of the serving systems, the supporting network infrastructure, and the mobile stations, among other factors. For example, a wireless serving system may provide a mobile station with circuit-switched voice communication service, enabling the mobile station to engage in communications via the serving system with entities on the Public Switched Telephone Network (PSTN) for instance. As another example, a wireless serving system may provide a mobile station with text messaging service, enabling the mobile station to send and receive text messages to other entities served by the serving system and/or by other serving systems. And as another example, a wireless serving system may provide a mobile station with packet-data communication service, enabling the mobile station to engage in communication via the serving system with entities on a packet-switched network such as the Internet. Such packet-data communication service could include voice service (e.g., voice-over-Internet-Protocol (VoIP) service) and other forms of packet-based real-time media service, as well as non-real-time service such as web browsing, messaging, and the like. Numerous other examples of wireless communication service are known, and still others will be developed.

To facilitate providing wireless communication service, a wireless serving system may wirelessly broadcast a pilot or reference signal that mobile stations can detect as an indication of the presence of the wireless serving system. Such a signal may identify the wireless serving system in some manner, to enable mobile stations to search for and detect particular systems. A mobile station may then be programmed with a prioritized list of systems that could serve the mobile station (such as a preferred roaming list (PRL) for instance), and the mobile station may scan the airwaves for pilot signals indicating the presence of such systems.

Upon detecting such a signal broadcast by a preferred wireless serving system, a mobile station may engage in air interface communication with the detected system to register with the system. The mobile station may then initiate communications via the system and/or the system may connect communications to the mobile station. For instance, the mobile station may send an air interface communication request to the system, seeking to engage in bearer communication via the system, the system may assign traffic channel resources for the requested communication, and the mobile station may proceed to engage in the communication. Likewise, the system may receive a request to connect a communication to the mobile station, the system may page the mobile station over an air interface, and upon receipt of a response from the mobile station, the system may similarly assign traffic channel resources to enable the mobile station to engage in the communication.

In practice, when a mobile station is in an "idle" state where it is registered with a wireless serving system and is served by a base station of that system but is not engaged in an active communication, the mobile station may regularly scan for potentially stronger or otherwise preferable coverage from another base station of that system (if applicable) or from another system. If the mobile station finds such other coverage, the mobile station may then engage in an idle handoff process, transitioning to be served by the other base station and/or other system. In turn, communications could be initiated as discussed above.

Likewise, when a mobile station is in an "active" state where it is registered with a wireless serving system and is engaged in a communication served by a base station of that system (such as a circuit-switched voice call, a packet-data session, or the like), the mobile station may similarly scan for potentially stronger or otherwise preferable coverage. And if the mobile station finds such other coverage, the mobile station may engage in an active handoff process by which the mobile station's communication is handed off to a new base station or new serving system.

In some situations, however, a mobile station may engage in a communication served by a particular serving system even though the mobile station is positioned at a location where potentially more desirable coverage may exist. For instance, in the arrangement of FIG. 1, serving system 14 may be a macro network that provides communication service at a first billing rate, and serving system 12 may be a femtocell that provides communication service at a second, lower billing rate (e.g., unlimited air interface communication). When mobile station 42 is positioned in the overlap area 36, it may be most desirable for the mobile station to be served by serving system 12 in order to benefit from the lower billing rate. However, for one reason or another, mobile station 42 may instead be served by serving system 14.

One reason for this could be that the mobile station begins its communication while within coverage of just serving system 14 (i.e., in coverage area 14 but not in overlap area 36) and is arranged to not scan for coverage of another serving system until after the communication ends. Thus, even if the mobile station moves into the overlap area 36 during the communication, the mobile station would continue to be served with the communication by serving system 14 and would not benefit from the lower billing rate that would apply if the communication had been served by serving system 12.

Another reason for this could be that coverage of serving system 12 is not particularly strong at the mobile station's location. For instance, due to air interface obstructions, poor configuration of serving system 12, or other factors, the mobile station may not detect a strong enough pilot signal from serving system 12. As a result, the mobile station may initiate the communication in coverage area 34, even if the mobile station is positioned in the overlap area 36 where serving system 12 may also provide coverage. Alternatively, as a result, when the mobile station moves into overlap area 36 while engaged in the communication served by serving system 14, the mobile station may not detect the presence of coverage area 32 or may not detect strong enough coverage of coverage area 32, and the mobile station may similarly not benefit from the lower billing rate that would apply if the communication had been served by serving system 12.

As noted above, the present method provides a mechanism for helping to control billing, in an effort to have billing align with user expectations. In particular, the method may involve (i) dynamically determining the scope of coverage of a first wireless serving system, (ii) making a determination of whether when a mobile station was served with communication service by a second wireless serving system, the mobile station was located within that determined scope of coverage of the first wireless serving system, and (ii) based on that determination, deciding how to bill for the communication service, such as whether to charge at one rate or another or whether to not charge for the communication service. This method can be carried out by any of a variety of network entities, alone or in combination, such as any of the entities in the arrangement shown in FIG. 1 for instance.

Figure 2:
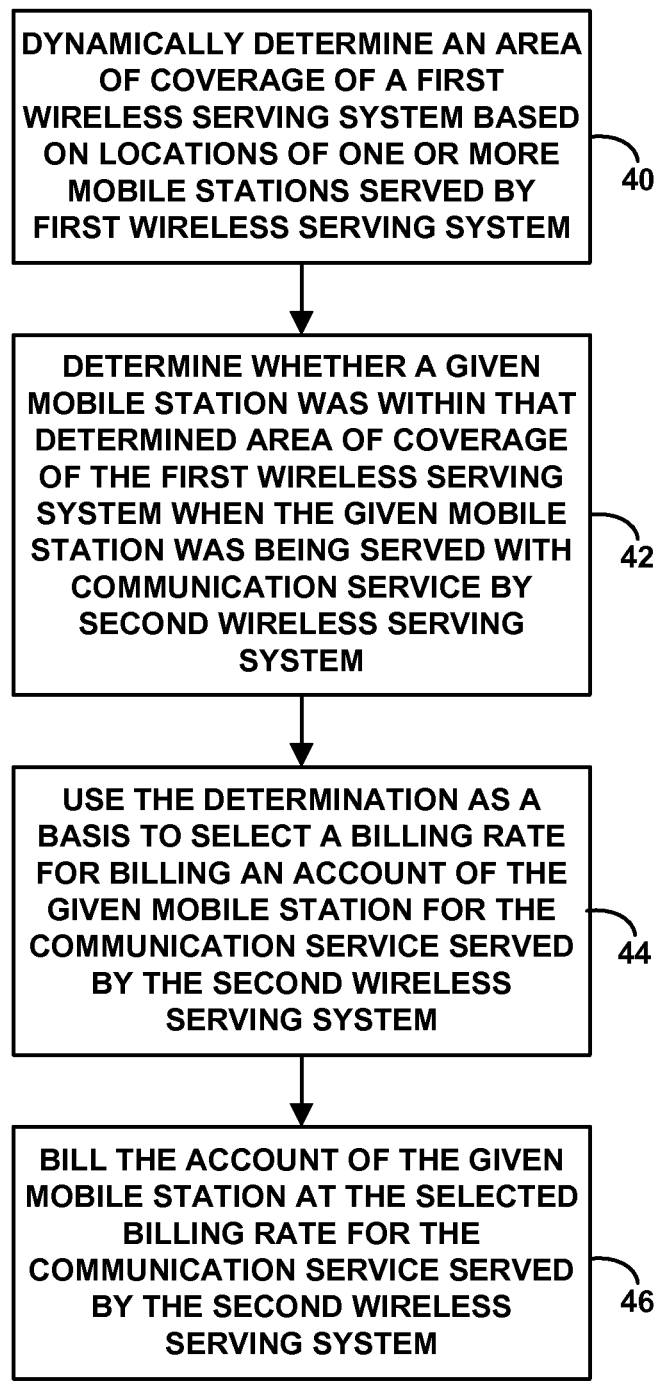
FIG. 2 is a flow chart depicting functions that can be carried out in accordance with the method.

FIG. 2 is a flow chart depicting more particularly a set of functions that can be carried out in accordance with the present method.

As shown in FIG. 2, at block 40, the method may involve dynamically determining an area of coverage of a first wireless serving system based on locations of one or more mobile stations served by the first wireless serving system. In particular, this function may involve (a) wirelessly receiving signals into the first wireless serving system from one or more mobile stations served by the first wireless serving system, (b) using the received signals as a basis to determine locations of the one or more mobile stations, and (d) using the determined locations of the one or more mobile stations as a basis to determine an area of coverage of the first wireless serving system.

A reason for carrying out this function is that the actual area of coverage of the first wireless serving system should encompass at least the locations of mobile stations being served by the first wireless serving system. Thus, locations of one or more mobile stations served by the first wireless serving system could form a reasonable basis for defining an area of coverage of the first wireless serving system. In practice, these locations could be multiple locations of a single mobile station served from time to time by the first wireless serving system and/or one or more locations of multiple locations served from time to time by the first wireless serving system. Being served by the first wireless serving system could involve registering with or being registered with the first wireless serving system, and could further involve being in the idle state, the active state, and/or another defined state.

For this purpose, the location of a mobile station served by the first wireless serving system could be a geographic location, such as latitude/longitude location coordinates for instance. Various techniques could be applied to determine such a location, based on signaling that the first wireless serving system wirelessly receives from the mobile station.

For example, each mobile station served by the first wireless serving system may be programmed to apply a GPS receiver by itself or through signaling interaction via the first wireless serving system with a location determination as described above so as to determine its location coordinates, and to transmit those determined location coordinates in a signal to the first wireless serving system. In this process, the first wireless serving system would thus receive one or more signals from the mobile station, and the first wireless serving system or another network entity could read the location from those signals or could derive the location from those signals. For instance, the one or more received signals may carry raw satellite positioning system data, and another entity such as a location determining system could use that raw data as a basis to derive the location of the mobile station, through triangulation for instance. Or the received signals may itself specify a determined location of the mobile station, and a network entity may determine the location based on the received signals by reading the specified location from the received signals.

As another example, a network entity, such as a base station of the first wireless serving system or an entity in the supporting network infrastructure for instance, may from time to time programmatically query a location determination system as that described above to trigger determination of the mobile station's location, or the location determination system itself may automatically do so. The location determination process may again involve signaling passing from the mobile station to the first wireless serving system, and that signaling may be used as a basis to determine the mobile station's location.

As still another example, if the geographic location coordinates of the mobile station are known at one point, the mobile station may use sensors such as an accelerometer, gyroscope, and magnetometer, as a basis to track its location through "dead reckoning", and the mobile station may report the thereby determined location in one or more signals to the first wireless serving system. Alternatively, one or more signals that the first wireless serving system receives from the mobile station may carry raw dead-reckoning data, such as direction and distance data, which a network entity could use a basis to determine the mobile station's location given knowledge of a reference (e.g., starting) location. Other techniques could be used as well.

Alternatively, the location of a mobile station served by the first wireless serving system could be a relative location such as a distance of the mobile station from a known location of a base station of the first wireless serving system. Such a location could be determined based on speed of radio frequency signaling passing from the mobile station to the base station. For instance, the base station could send to the mobile station a message that causes the mobile station to respond to the base station with a time-stamped signal. The base station, or other network entity, may then compute the distance of the mobile station from the base station based on the time it took that signal to arrive at the base station.

In practice, an entity carrying out this method (such as a base station of the first wireless serving system) may deem the area of coverage of the first wireless serving system to be an area encompassing the determined locations of the one or more mobile stations served by the first wireless serving system. For example, given numerous geographic locations, the entity may programmatically fit a polygon to those locations and deem the area of coverage to be that polygon. As another example, given numerous distances of mobile stations from a base station of the first wireless serving system, the entity may deem the area of coverage to be a circle around the base station having a radius equal to the longest such distance. More complex geometric modeling could be used as well, to estimate the area of coverage of the first wireless serving system based on the signals received from the one or more mobile stations served by the first wireless serving system. This is particularly the case if the coverage area of the first wireless serving system emanates from more than one base station.

Further, the area of coverage of the first wireless serving system may be continually updated over time as additional determinations are made regarding the locations of one or more mobile stations served by the first wireless serving system. Further, the determined area of coverage of the first wireless serving system may be transmitted to another network entity for additional processing in accordance with the method.

Continuing with reference to FIG. 2, at block 42, the method may then involve making a determination of whether a given mobile station was within the thereby determined area of coverage of the first wireless serving system when the given mobile station was being served with communication service by a second wireless serving system. This function may be carried out by a billing system server or other entity through analysis of usage records (e.g., CDRs or IPDRs) and corresponding locations for the given mobile station. Further, the given mobile station could be one of those whose location was used as a basis to determine the area of coverage of the first wireless serving system, and the given mobile station might not be served by the first wireless serving system when the mobile station was being served with the communication service by the second wireless serving system.

To implement this function in practice, the location of the given mobile station can be tracked over time as the mobile station engages in the given communication. Any of the techniques described above could be used for this purpose. For instance, the mobile station may itself determine its location from time to time as it is being served with the communication service, and/or a network entity may determine the location of the mobile station from time to time as the mobile station is being served with the communication service. This location information can be time-stamped, to allow the mobile station's location to be correlated with time of the communication service.

In practice, an entity carrying out this function may evaluate one or more usage records for the communication service provided to the mobile station by the second wireless serving system, to determine a time that such service was provided, and the entity may refer to the mobile station's time-stamped location information to determine where the mobile station was located at the determined time. Upon determining the location where the mobile station was located when being served with communication service by the second wireless serving system, the entity may then determine whether that location is within the determined area of coverage of the first wireless serving system.

As shown at block 44, the method may then involve using determination as a basis to select a billing rate for billing an account of the given mobile station for the communication service served by the second wireless serving system. This function may similarly be carried out by a billing system server or other entity.

In practice, this function may involve selecting a first billing rate for billing if the determination is that the mobile station was within the determined area of coverage of the first wireless serving system when the mobile station was served with the communication service by the second wireless serving system, but selecting a second, different billing rate for billing if the determination is that the mobile station was not within the determined area of coverage of the first wireless serving system when the mobile statin was served with the communication service by the second wireless serving system. Optimally, the first billing rate may be a rate that would normally be charged for communication service provided by the first wireless serving system, and may thus be more in line with user expectations for service provided to the mobile station located within the area of coverage of the first wireless serving system. The second billing rate, on the other hand, may be that normally charged for communication service provided by the second wireless serving system.

At block 46, the method may then involve billing the account of the given mobile station at the selected billing rate for the communication service served by the second wireless serving system. In practice, for instance, this may involve a billing system server generating a paper or electronic bill that incorporates a charge at the selected billing rate for the communication service, regardless of whether that charge is specifically described in the bill. Further, this may involve debiting the account accordingly.

In line with the discussion above, the first wireless serving system may be operated by a home wireless carrier to which the given mobile station subscribes, and the second wireless serving system may be operated by a wireless carrier to which the given mobile station does not subscribe but that serves the given mobile station in accordance with a roaming agreement with the first wireless carrier. In that case, as discussed above, the home carrier may (i) receive usage records or other billing records from the other wireless carrier, reporting that the communication service was provided to the given mobile station, (ii) determine where the given mobile station was positioned when the reported communication service was provided to the given mobile station, and (iii) determine that where the mobile station was positioned when the reported communication service was provided to the given mobile station was within the determined area of coverage of the first wireless serving system.

Alternatively, as further discussed above, the first wireless serving system could be a femtocell that provides private wireless coverage (e.g., within a home or office) and connectivity for home wireless carrier to which the given mobile station subscribes, and the second wireless serving system could be a macro base station providing public coverage and connectivity for the home wireless carrier. In that case, as discussed above, the home wireless carrier may (i) determine where the given mobile station was positioned when the macro base station was providing the communication service to the given mobile station and (ii) determine that where the mobile station was positioned when the macro base station was providing the communication service to the given mobile station was within the thereby determined area of coverage of the femtocell.

Figure 3:
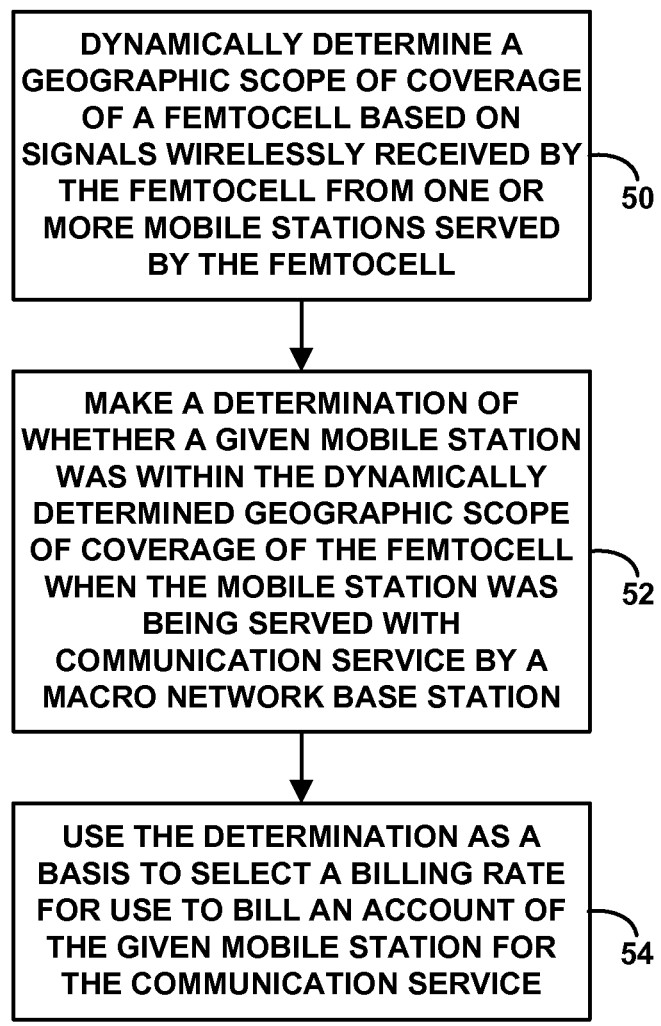
FIG. 3 is another flow chart depicting functions that can be carried out in accordance with the method.

Referring next to FIG. 3, another flow chart is provided, to depict functions that can be carried out in accordance with the present method, particularly in the femtocell implementation. As shown in FIG. 3, at block 50, the method involves dynamically determining a geographic scope of coverage of a femtocell based on signals wirelessly received by the femtocell from one or more mobile stations served by the femtocell. At block 52, then method involves making a determination of whether a given mobile station was within the dynamically determined geographic scope of coverage of the femtocell when the mobile station was being served with communication service by a macro network base station (e.g., when the mobile station was not being served by the femtocell). And at block 54, the method involves using that determination as a basis to select a billing rate for use to bill an account of the given mobile station for the communication service.

These functions can be carried out largely in the manner described above for instance. By way of example, the act of dynamically determining the geographic scope of coverage of the femtocell based on signals wirelessly received by the femtocell from one or more mobile stations served by the femtocell could involve (i) determining round trip delay based on at least one such signal, (ii) using the determined round trip delay as a basis to determine a distance of at least one of the mobile stations from the femtocell, and (iii) dynamically determining the geographic scope of coverage based on the determined distance of the at least one mobile station from the femtocell. Alternatively, the signals may carry location coordinates of the one or more mobile stations and/or raw data usable to determine location coordinates of the one or more mobile stations.

As another example, the femtocell and macro network base station could both function to provide service for a wireless carrier to which the given mobile station subscribes. Yet, as described above, the carrier might apply a billing rate of zero (e.g., allow unlimited air time service) for communication service served by the femtocell but may apply a non-zero billing rate for communication service served by the macro network base station.

Figure 4:
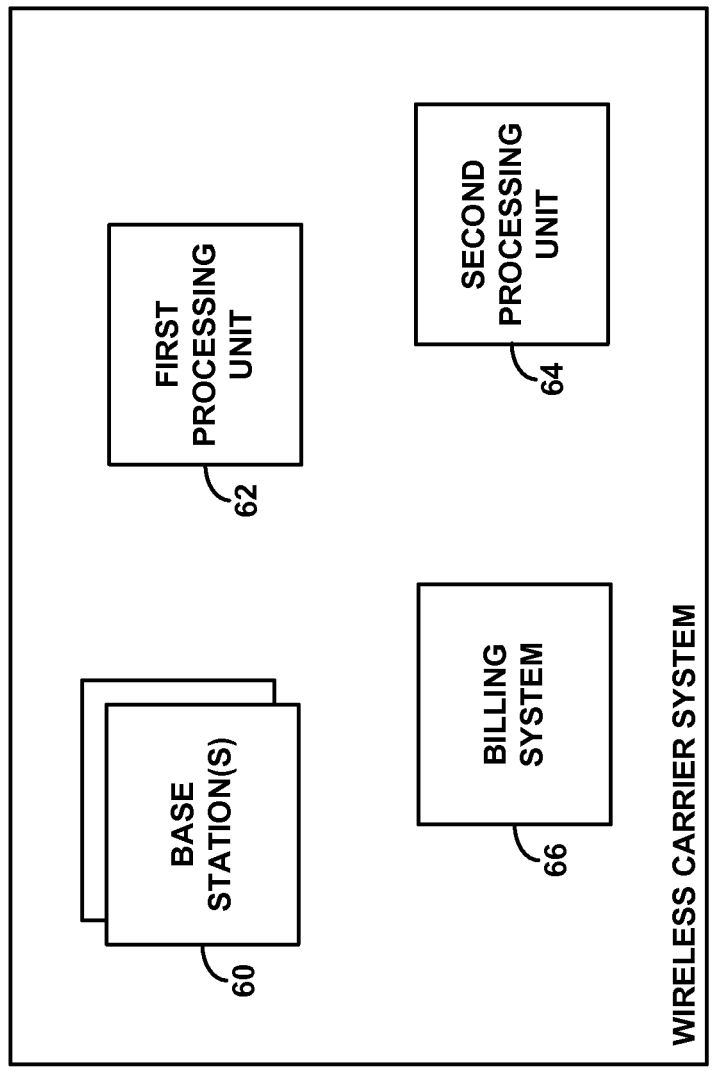
FIG. 4 is a simplified block diagram depicting components of a wireless carrier's system that can implement the method.

FIG. 4 next depicts components of a wireless carrier system that could function to implement the present method in practice. As shown, the system includes at least one base station 60 for serving mobile stations. Each such base station may be part of the first wireless serving system or may itself be the first wireless serving system.

Further, the system includes a first processing unit (e.g. programmed computer server, microprocessor, or other processing unit) 62 arranged to determine based on signals that the at least one base station wirelessly received from one or more of the mobile stations, a geographic scope of coverage of the at least one base station, and a second processing unit 64 arranged to make a determination of whether, when a given mobile station was being served with communication service by a particular base station that is not one of the at least one base station, the given mobile station was located within the determined geographic scope of the at least one base station. And the system includes a billing system 66 (e.g., programmed computer server, microprocessor, or other processing unit) arranged to bill an account of the given mobile station for the communication service at a billing rate selected based on the determination.

In practice, processing units 62, 64 may be one and the same and may in fact be components of the at least one base station 60, of the billing system 66, or other aspect of the wireless carrier's system.

Applying the example scenarios described above, for instance, the at least one base station may be a femtocell that provides connectivity for a wireless carrier network, and the particular base station may be a macro network base station that also provides connectivity for the wireless carrier network. Alternatively, the at least one base station may be one or more macro network base stations provided by a home carrier, and the particular base station may be a roaming partner's base station. Other examples are possible as well.

An exemplary embodiment of the present method and system has been described above. Those of ordinary skill in the art will appreciate, however, that modifications from the embodiment described can be made while remaining within the spirit and scope of the invention as claimed.

What is claimed is:

1. A method comprising:

wirelessly receiving signals into first wireless serving system from one or more mobile stations served by the first wireless serving system, using the received signals as a basis to determine locations of the one or more mobile stations, and using the determined locations of the one or more mobile stations as a basis to determine an area of coverage of the first wireless serving system;

making a determination of whether a given mobile station was within the thereby determined area of coverage of the first wireless serving system when the given mobile station was being served with communication service by a second wireless serving system; and using the determination as a basis to select a billing rate for billing an account of the given mobile station for the communication service served by the second wireless serving system.

2. The method of claim 1, further comprising billing the account of the given mobile station at the selected billing rate for the communication service served by the second wireless serving system.

3. The method of claim 1, wherein the first wireless serving system is operated by a first wireless carrier to which the given mobile station subscribes, and wherein the second wireless serving system is operated by a second wireless carrier to which the given mobile station does not subscribe but that serves the given mobile station in accordance with a roaming agreement with the first wireless carrier.

4. The method of claim 3, wherein making the determination of whether the given mobile station was within the thereby determined area of coverage of the first wireless serving system when the given mobile station was being served with communication service by the second wireless serving system comprises:

the first wireless carrier receiving from the second wireless carrier a report that the communication service was provided to the given mobile station;

the first wireless carrier determining where the given mobile station was positioned when the reported communication service was provided to the given mobile station; and the first wireless carrier determining that where the mobile station was positioned when the reported communication service was provided to the given mobile station was within the thereby determined area of coverage of the first wireless serving system.

5. The method of claim 1, wherein the first wireless serving system is a femtocell providing private coverage and connectivity for a wireless carrier to which the given mobile station subscribes, and wherein the second wireless serving system is a macro base station providing public coverage and connectivity for the wireless carrier to which the given mobile station subscribes.

6. The method of claim 5, wherein making the determination of whether the given mobile station was within the thereby determined area of coverage of the first wireless serving system when the given mobile station was being served with communication service by the second wireless serving system comprises:

the wireless carrier determining where the given mobile station was positioned when the macro base station was providing the communication service to the given mobile station; and the wireless carrier determining that where the mobile station was positioned when the macro base station was providing the communication service to the given mobile station was within the thereby determined area of coverage of the femtocell.

7. The method of claim 1, wherein using the determination as a basis to select a billing rate for billing an account of the given mobile station for the communication service served by the second base station comprises:

if the determination is that the given mobile station was within the thereby determined area of coverage of the first wireless serving system when the given mobile station was being served with communication service by the second wireless coverage system, then selecting a first billing rate as the billing rate; and if the determination is that the given mobile station was not within the thereby determined area of coverage of the first wireless serving system when the given mobile station was being served with communication service by the second wireless serving system, then selecting a second billing rate as the billing rate, the second billing rate being different than the first billing rate.

8. The method of claim 1, wherein the given mobile station was not being served by the first wireless serving system when the mobile station was being served with the communication service by the second wireless serving system.

9. The method of claim 1, wherein the signals from the one or more mobile stations carry raw data usable as a basis to derive locations of the one or more mobile stations, the raw data comprising at least one of satellite positioning system data and dead-reckoning data.

10. The method of claim 1, wherein the signals from the one or more mobile stations carry data specifying the locations of the one or more mobile stations, and wherein using the received signals as a basis to determine locations of the one or more mobile stations comprises reading the data from the received signals to determine the specified locations.

11. A method comprising:

dynamically determining a geographic scope of coverage of a femtocell based on signals wirelessly received by the femtocell from one or more mobile stations served by the femtocell;

making a determination of whether a given mobile station was within the dynamically determined geographic scope of coverage of the femtocell when the given mobile station was being served with communication service by a macro network base station; and using the determination as a basis to select a billing rate for use to bill an account of the given mobile station for the communication service served by the macro network base station.

12. The method of claim 11, wherein dynamically determining the geographic scope of coverage of the femtocell based on signals wirelessly received by the femtocell from one or more mobile stations served by the femtocell comprises (i) determining round trip delay based on at least one such signal, (ii) using the determined round trip delay to determine a distance of at least one of the mobile stations from the femtocell, and (iii) dynamically determining the geographic scope of coverage based on the determined distance of the at least one mobile station from the femtocell.

13. The method of claim 11, wherein the signals carry at least one of (i) location coordinates of the one or more mobile stations and (ii) raw data usable to determine location coordinates of the one or more mobile stations.

14. The method of claim 11, wherein the femtocell and macro network base station both function to provide service for a wireless carrier to which the given mobile station subscribes.

15. The method of claim 11, wherein using the determination as a basis to select a billing rate for use to bill an account of the given mobile station for the communication service comprises:

if the determination is that the given mobile station was within the dynamically determined geographic scope of coverage of the femtocell when the mobile station was being served with communication service by a macro network base station, then selecting a first billing rate for use to bill the account of the given mobile station for the communication service; and if the determination is that the given mobile station was not within the dynamically determined geographic scope of coverage of the femtocell when the mobile station was being served with communication service by a macro network base station, then selecting a second billing rate for use to bill the account of the given mobile station for the communication service, the second billing rate being different than the first billing rate.

16. The method of claim 15, wherein the first billing rate is zero, and the second billing rate is non-zero.

17. The method of claim 11, wherein the given mobile station was not being served by the femtocell when the mobile station was being served with the communication service by the macro network base station.

18. A wireless carrier system comprising:

at least one base station for serving mobile stations;

a first processing unit arranged to determine based on signals that the at least one base station wirelessly received from one or more of the mobile stations, a geographic scope of coverage of the at least one base station;

a second processing unit arranged to make a determination of whether, when a given mobile station was being served with communication service by a particular base station that is not one of the at least one base station, the given mobile station was located within the determined geographic scope of the at least one base station; and a billing system arranged to bill an account of the given mobile station for the communication service served by the particular base station at a billing rate selected based on the determination.

19. The wireless carrier system of claim 18, wherein the second processing unit is the first processing unit.

20. The wireless carrier system of claim 18, wherein the at least one base station is a femtocell providing connectivity for a wireless carrier network, and wherein the particular base station is a macro network base station also providing connectivity for the wireless carrier network.

* * * * *